Figure 1:
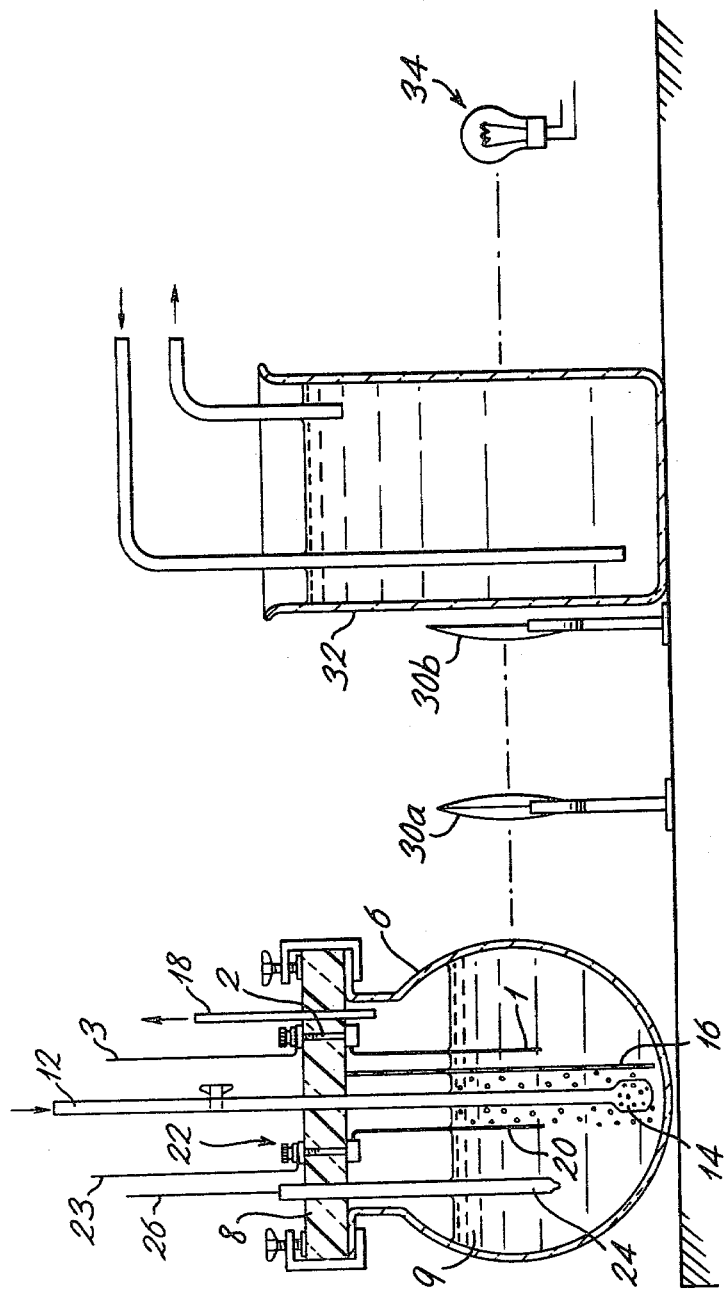

United States Patent [19]

Davidson et al.

[11] 4,305,794
[45] Dec. 15, 1981

[54] PHOTOCHEMICAL ELECTRODE

[75] Inventors: Robert S. Davidson; Charles J. Willsher, both of Leicester, England

[73] Assignee: National Research Development Corporation, London, England

[21] Appl. No.: 178,463

[22] PCT Filed: Apr. 18, 1979

[86] PCT No.: PCT/GB79/00062
§ 371 Date: Dec. 19, 1979
§ 102(e) Date: Dec. 19, 1979

[87] PCT Pub. No.: WO79/00992
PCT Pub. Date: Nov. 29, 1979

[30] Foreign Application Priority Data

Apr. 27, 1978 [GB] United Kingdom ............... 16766/78
Dec. 8, 1978 [GB] United Kingdom ............... 47745/78

[51] Int. Cl.³ .......................... C25B 1/04; H01M 6/36
[52] U.S. Cl. .................... 204/129; 204/130; 204/290 R; 204/DIG. 3; 429/111
[58] Field of Search .................... 429/111; 204/290 R, 204/129, DIG. 3, 130

[56] References Cited

U.S. PATENT DOCUMENTS 4,037,029 7/1977 Anderson ............................. 429/111
4,204,933 5/1980 Barlow et al. .................. 204/181 N
4,225,408 9/1980 Barlow et al. .................. 204/181 N

FOREIGN PATENT DOCUMENTS 55-9419 1/1980 Japan .................................. 429/111

OTHER PUBLICATIONS

A. W. Copeland et al., "The Photovoltaic Effect", Chem. Revs., vol. 31, pp. 213 and 221 (1942).
G. Athanasiu, Compt. Rend., vol. 175, pp. 214–217 (1922).
G. Athanasiu, Compt. Rend., vol. 180, pp. 587–589 (1925).

Primary Examiner—Aaron Weissstuch
Attorney, Agent, or Firm—Oblon, Fisher, Spivak, McClelland & Maier

[57] ABSTRACT

Photochemical electrode can decompose water when irradiated with visible light and consists of red mercuric sulphide blackened by iodide treatment as a coating on a platinum mesh.

12 Claims, 2 Drawing Figures

PHOTOCHEMICAL ELECTRODE

This invention relates to a photochemical electrode.

A photochemical electrode will exhibit, in electrolyte, a potential difference relative to a reference electrode, this potential difference varying with the intensity and wavelength of illumination. Using such an electrode, light energy can be converted into electrical energy, for example by putting a photochemical electrode and an inert counterelectrode into electrolyte, making an electrical circuit between the electrodes, and illuminating the photochemical electrode while keeping the other dark.

Known photochemical electrodes are usually either stable towards light, but responsive only to wavelengths in the ultraviolet, or responsive to visible light but decompose under its action. The ultraviolet-responsive type may be sensitized to visible light by expedients such as adsorbed dyes, dopants or dissolved sensitizers, and the light-decomposable type may be protected by coating with metal or stable semiconductor or by adding redox couples which will compete with the decomposition reaction, but these efforts are troublesome.

A photochemical electrode would thus be desirably stable towards visible light and photochemically responsive to it.

The present invention is a photochemical electrode comprising a conductive member contacting initially-red mercuric sulphide, which need not be a single crystal. The member may be a mesh (which may be woven or expanded), for example of metal such as platinum or titanium or of carbon fibers, and the mercuric sulphide may form a coating on the member. Alternatively, the mercuric sulphide may be in some such form as a slurry or suspension or fluidised bed.

The coating may be applied by dipping the conductive member (carrier) in a suspension of red mercuric sulphide and drying the conductive member in air (preferably blown hot air), and repeating the dipping and drying as necessary. The mercuric sulphide coated on the electrode may be pretreated by using the electrode in a reducing electrolyte until the mercuric sulphide is blackened; the electrode is then preferably washed clean of reductant. The atomic % of mercury in the blackened mercuric sulphide is preferably at least 48.9%. The blackening is preferably performed while irradiating the mercuric sulphide. The reductant is preferably from 0.05 M to 1.0 M. The duration of this pretreatment may be from 30 to 240 minutes, preferably from 45 to 180 minutes, more preferably up to 120 minutes, preferably at a potential in the reductant of within 0.2 V of the standard calomel electrode. The reductant may be a halide (especially iodide) or thiocyanate for example.

The invention in another aspect comprises converting visible light into electricity using the photochemical electrode set forth above, whereto no biassing potential need be applied. For this purpose there may be provided a cell comprising the photochemical electrode, an inert counterelectrode, and an electrolyte, such as aqueous sodium nitrate solution, optionally including a reducing agent, and allowing visible light to be absorbed by the mercuric sulphide, a circuit being provided connecting the photochemical electrode and the counterelectrode, in which circuit electricity flows depending on the light.

Some reducing agents such as iodide ion may increase the photocurrent but may also solubilise the mercuric sulphide.

This cell need not be driven by an applied potential, but it may be if desired.

The invention in a further aspect is photoassisted electrolysis of water using the photochemical electrode set forth above, applying, between the photochemical electrode and a counterelectrode both in the same body of water, a biassing potential (which may be 0.0 V) less than the thermodynamic potential for electrolysing the water, allowing visible light to be absorbed by the mercuric sulphide, and collecting any product(s) from the counterelectrode and/or photochemical electrode.

The best biassing potential appears to be pH-dependent, and to depend on the duration of the blackening pretreatment. Where that was from 120 to 240 minutes, a 0.0 V bias can deliver good photocurrent. A preferred biassing potential vs. the standard calomel electrode for a reasonable rate of electrolysis is +0.2 to +1.0 V, preferably +0.3 to +0.6 V.

Red (non-preblackened) mercuric sulphide in some circumstances becomes black in use. In this form it still does not always dissolve and furthermore it absorbs longer wavelengths, which is advantageous. Red cinnabar from different sources can give rise to photopotentials of different magnitude. After blackening, however, all samples behave consistently.

Figure 2:
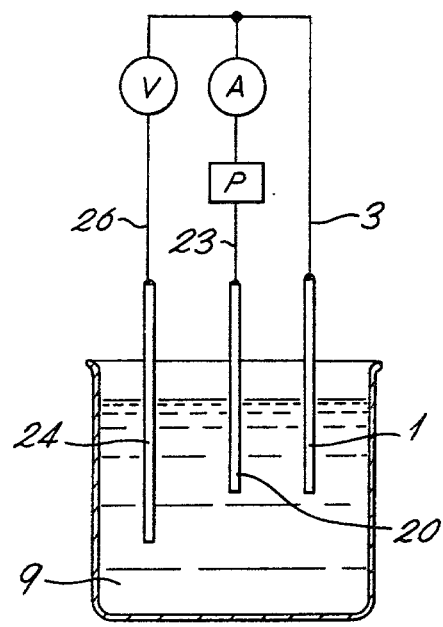

The invention will now be described by way of example with reference to the accompanying drawings, in which FIG. 1 shows a cell including a photochemical electrode according to the invention, and FIG. 2 is a circuit diagram of the cell of FIG. 1.

PREPARATION OF PHOTOCHEMICAL ELECTRODE

Analytical grade red mercuric sulphide HgS (2 g) is placed in 30 ml of de-oxygenated de-ionized water, which is boiled until the volume is 25 ml, thus ensuring a dispersed suspension of the mercuric sulphide. The suspension is further dispersed by an ultrasonic probe.

A platinum mesh is taken. This mesh consists of a plain weave of 0.25 mm diameter platinum wire at 0.7 mm centers. (Other weaves, such as twill and hollander, may also be used.) A rectangle of mesh 15 mm × 30 mm is mounted on a platinum strap 5 mm × 15 mm, the long direction of the strap being parallel to the shorter side of the rectangle and midway along the longer side. The strap has a 1 mm diameter platinum wire about 60 mm long for electrical connection purposes.

The mesh is swirled around the suspension, removed and dried in a blown hot air stream. This is repeated until an even red coating is obtained, weighing in practice 20 to 25 mg, although this is not critical; by using a more dilute suspension, a 5 mg coating has been obtained which behaves the same as a 20 mg coating.

Solubilisation of mercury from the mercuric sulphide occurs when it is used in an electrolyte containing easily oxidisable ions such as iodide. This is unfortunate since the presence of iodide ions can considerably enhance the photocurrent and can furthermore cause darkening of the mercuric sulphide, which, extremely advantageously, enhances spectral response (that is, it will absorb not only visible but also longer (infra-red) wavelengths). The darkened material includes cinnabar, metacinnabar and unidentified material. The atomic % of mercury in the HgS was 50.0%, giving a reflectance at 700 nm of 78%.

Here, however, we exploit the favorable features of reducing-agent-treatment, in this example iodide-treatment, of cinnabar. The electrode is used in an irradiated iodide (0.1 M KI) electrolyte at 0.0 V with respect to a standard calomel electrode for 60 minutes (until blackened), then removed and washed well with distilled water.

The coated mesh, which is the desired photochemical electrode, is conditioned by storing for at least 15 hours in de-oxygenated decimolar aqueous sodium nitrate.

CELL

Turning to FIG. 1, an experimental cell according to the invention, for converting visible light into electricity, comprises an electrode 1 which is the photochemical electrode prepared as described above. The photochemical electrode 1 has, as already described, a platinum wire for electrical connection purposes, and this wire is connected to a brass screw 2, and the screw 2 to a lead 3 to an external circuit.

The electrode 1 is mounted in a (nominal quarter-liter) flask 6 closed by a tightly clamped lid 8. The flask 6 contains 250 ml of decimolar aqueous sodium nitrate solution 9 which has been de-oxygenated and which, to keep it that way, is continuously purged with nitrogen which enters at a modest rate by an inlet 12. The sodium nitrate solution 9 is the electrolyte. The inlet 12 feeds to a sparger 14 arranged to deliver the nitrogen as streams of fine bubbles. A black plastics barrier plate 16 protects the photochemical electrode 1 from the bubbles. Nitrogen is vented from the flask 6 through an outlet 18 in the lid 8.

A counter electrode 20 is mounted dipping into the solution 9, similarly to the photochemical electrode 1, by way of a platinum wire connected to a brass screw 22 held, just as the screw 2, in the lid 8, and connected to a lead 23 to the external circuit. The counter electrode 20 is identical to the photochemical electrode 1, except that it is not coated with any mercuric sulphide.

Also in the flask 6, a reference electrode 24 (a saturated calomel electrode) is mounted through the lid 8 dipping into the solution 9 and has a reference lead 26 for voltage measurement purposes.

CONVERTING VISIBLE LIGHT INTO ELECTRICITY

Still referring to FIG. 1, the cell just described is set on a bench with the photochemical electrode 1 to the right-hand side (for ease of description) of the black plate 16. Further to the right along the bench are a first lens 30a and a second lens 30b (10 cm and 18 cm respectively from the photochemical electrode 1), the lenses being convergent with focal lengths of 5 cm and 13 cm respectively and defining a light path directed onto the photochemical electrode 1.

To the right of the lens 30b, a glass tank 32 acts as a light filter, containing a 0.28 M aqueous solution, held at 5° C., of cupric chloride ($CuCl_2$) offering a path length of 11 cm to light from a 50 cm distance 2 kW xenon cinema-projector lamp 34. The light filter tank 32 transmits (maximum) 40% at 515 nm and 3% at 400 nm, and is kept cool by continuously circulating the contents through the pipes shown to a refrigerator.

In the dark, there is a small irreproducible potential between the leads 3 and 26, but when the lamp 34 is 'on' a relative potential of −195 mV is eventually reached and declines to the dark potential when the lamp 34 is switched 'off'. When the lamp is on, the potential indicates that useful electrical work (a photocurrent of 18.5 microamps) may be obtained.

Turning to FIG. 2, which is a circuit diagram, the electrolyte solution 9 of FIG. 1 contacts the photochemical electrode 1, the counter electrode 20 and the reference electrode 24 whose respective leads are 3, 23 and 26. A high-impedance voltmeter V is connected across the photochemical and reference electrodes, and an ammeter A (or any circuit capable of doing useful work when current flows in it) connects the photochemical and counter electrodes.

The preferred pH of the electrolyte solution 9 is 2 to 13, as both at too low pH (such as 1.5 M nitric acid) and at too high pH (such as 2 M potassium hydroxide), non-repeatable potentials are obtained, and also, even in the dark, the photochemical electrode 1 and the counter electrode 20 can pass a current through A of 200 microamps (positive or negative depending on whether acid or alkaline). When the iodide-blackened electrode is used in a non-iodide or other relatively non-oxidisable electrolyte, we have found that there is no further solubilisation of mercury. Highly acidic or alkaline solutions may solubilise the mercuric sulphide. This dark current and these pH values do not, however, appear otherwise to damage the photochemical electrode, which recovers to behave normally when returned to decimolar sodium nitrate. The potential experienced by the voltmeter V as pH increases, both in the light and in the dark, becomes more negative, relative to the reference electrode 24, at the rate of about 60 mV per unit of pH. The relative photopotential does not vary with pH.

The current through A (without any bias) did not fall even after 2 hours' continuous illumination. The solution 9 did not show any trace of mercury after this time. (Limit of detection was 10 μg/ml.) A gas is slowly evolved at the photochemical electrode 1. This is tentatively believed to be oxygen (that is, the mercuric sulphide might be assisting the photodecomposition of water), which could be collected as a useful product.

PHOTOASSISTED ELECTROLYSIS OF WATER

The cell of FIG. 1 was now applied to the photoassisted electrolysis of water of pH 4. The potentiostat (P in FIG. 2) was set so as to provide a potential difference between the photochemical electrode and the counter-electrode 20 of 0.6 V. In the dark, almost nothing happened. With the xenon lamp 34 on, after a period of time, bubbles began to be evolved at the counterelectrode 20, and are believed to be hydrogen. This indicates that the water was being electrolysed. The thermodynamic potential for electrolysing the water under these conditions would have been 1.23 V, which with overvoltage demands about 1.6 V. A product might also be collectable from the photochemical electrode 1. The relative photocurrent under these conditions was 28 microamps.

We claim:

1. A photochemical electrode for use in an electrochemical cell, comprising:
    a conductive member in contact with photochemically active, blackened mercuric sulfide, said mercuric sulfide initially applied to said conductive member as red mercuric sulfide and being converted to said black form upon contact of said electrode with a reducing electrolyte.

2. The electrode of claim 1, wherein said conductive member is a mesh.

3. The electrode of claim 2, wherein said conductive member is a mesh of metal or of carbon fibers.

4. The electrode of claim 1, wherein said mercuric sulfide forms a coating on said conductive member.

5. The electrode of claim 1, wherein said mercuric sulfide is applied to said conductive member in the form of a slurry, suspension or fluidised bed of initially red mercuric sulfide.

6. The electrode of claim 1, wherein said reducing electrolyte contains a halide ion or thiocyanate ion as a reducing agent.

7. The electrode of claim 1 or 6, wherein the atomic percent of mercury in said blackened mercuric sulfide is at least 48.9%.

8. The electrode of claim 6, wherein said mercuric sulfide is blackened in said reducing electrolyte at a potential of within 0.2 V of the standard calomel electrode.

9. The electrode of claim 6 or 8, wherein said mercuric sulfide is blackened over a period of from 30–240 minutes.

10. A method for converting light into electricity in a photochemical cell, comprising;
   subjecting a photochemical electrode to light in said photochemical cell additionally containing an inert counterelectrode and an electrolyte in which said electrodes are immersed, thus generating an electrical current within said cell said photochemical electrode comprising a conductive member in contact with photochemically active, blackened mercuric sulfide, said mercuric sulfide initially applied to said conductive member as red mercuric sulfide and being converted to said black form upon contact of said electrode with a reducing electrolyte.

11. A method of electrolysing water in a photochemical cell, comprising;
   subjecting a photochemical electrode 13 to light in said photochemical cell additionally containing an inert counterelectrode and an aqueous electrolyte in which said electrodes are immersed, thereby generating an electrical current within said cell which results in the generation of hydrogen at one of said electrodes and oxygen at the other electrode; and
   collecting the products of electrolysis said photochemical electrode comprising a conductive member in contact with photochemically active, blackened mercuric sulfide, said mercuric sulfide initially applied to said conductive member as red mercuric sulfide and being converted to said black form upon contact of said electrode with a reducing electrolyte.

12. The method of claim 11, wherein a biasing potential of a potential less than the thermodynamic potential for electrolysing water is applied across said electrodes.

* * * * *